Patented May 27, 1924.

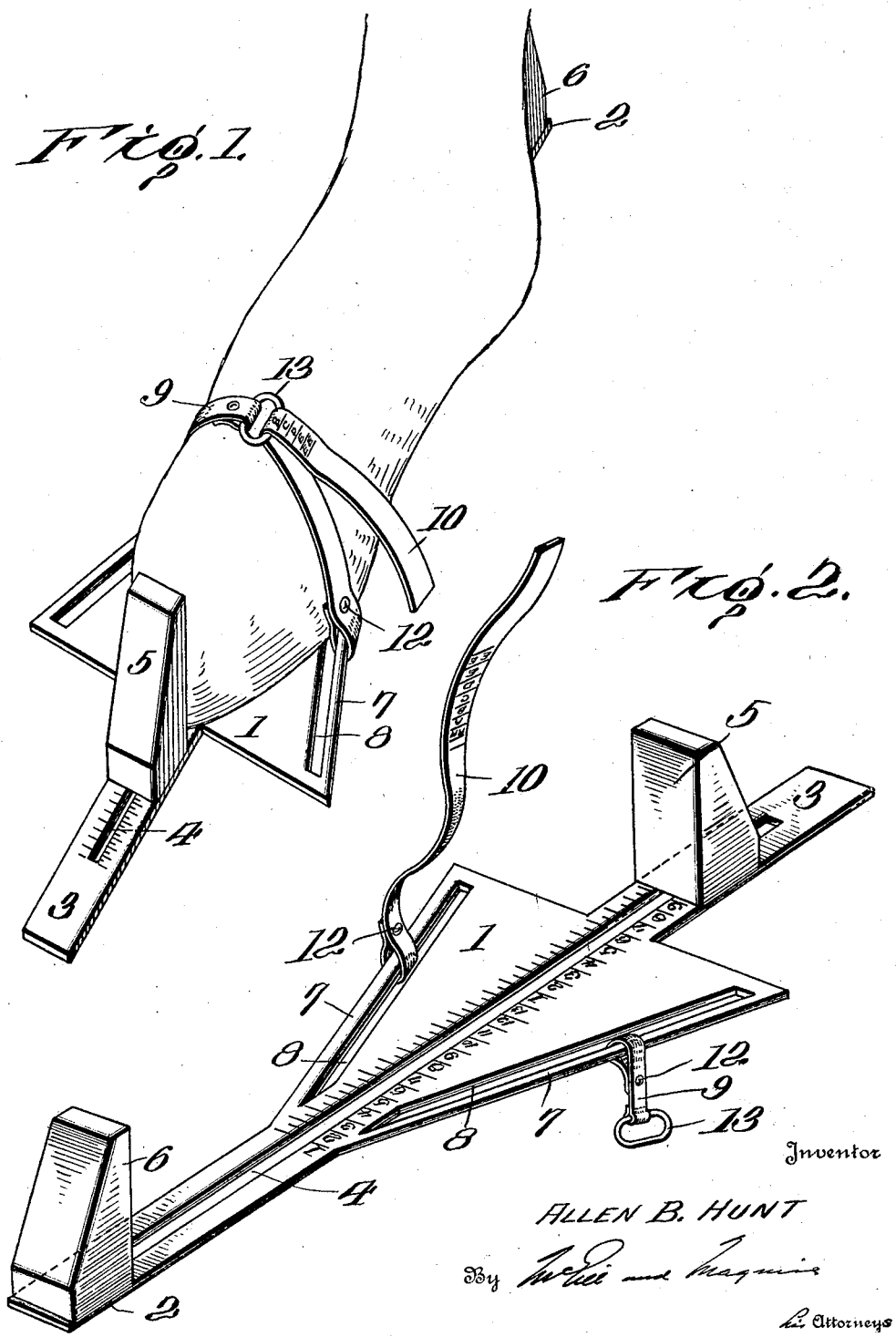

1,495,903

UNITED STATES PATENT OFFICE.

ALLEN B. HUNT, OF UHRICHSVILLE, OHIO.

FOOT-MEASURING DEVICE.

Application filed March 16, 1922. Serial No. 544,237.

*To all whom it may concern:*

Be it known that I, ALLEN B. HUNT, of Uhrichsville, in the county of Tuscarawas and State of Ohio, have invented certain new and useful Improvements in Foot-Measuring Devices; and I do hereby declare the following to be a full, clear, and exact description of the invention, such as will enable others skilled in the art to which it appertains to make and use the same.

This invention relates to measuring instruments, and especially to such as are used in measuring the human foot for fitting boots or shoes, it being the object of the invention to provide a device of this character with but a minimum number of parts so constructed and arranged that the length and the width of the foot may be readily and quickly measured, the simplicity of the device making for its economical manufacture and insuring ready adaptability for continuous service without likelihood of disarrangement of its elements.

In the drawings Figure 1 is a perspective view of my improved device in actual use and Figure 2 shows the device ready to be put in use.

The base of my improved device is preferably of such material as steel, iron, wood or aluminum or other wear resisting substance, and includes a central portion 1 of approximately triangular form and two end portions 2 and 3, the former being a continuation of the apex of the triangular central portion and the end 3 an integral part of the base of the triangle. A slot 4 centrally disposed of and coextensive with the portion 1 extends well along the length of each end portion and its walls form the guide for a toe-block 5 which is adapted for movement along the base. Heel block 6, in complement to the block 5, is fixedly secured to the end portion 2. Paralleling each of the edges 7 of the triangular portion 1 is a slot 8 through which co-acting tapes 9 and 10 are passed, each being secured to its respective side for sliding movement therealong by a detachable fastener 12. The tape 9 has a ring 13 at its free end to receive the tape 10 on the underface of which are letters indicating shoe widths. A size scale for measuring the length of a foot is placed alongside the centrally disposed slot, the sizes shown in the drawing indicating two sets of sizes such as commonly employed.

In use the heel of the foot to be measured is placed against the heel block 6 and the toe block 5 is moved forward until it comes in contact with the great toe. The reading on the scale adjacent the slot 4 will indicate, to one skilled in fitting boots and shoes, the proper length of shoe. To ascertain the width required, the tapes are placed, one at the ball joint of the great toe, and the other at the ball joint of the little toe. The tape 10 is then passed through the ring 13 and drawn firm around the ball of the foot; the reading on tape 10 at the ring 13 indicates the proper width of shoe required. The triangular portion of the base with the tapes 9 and 10 secured thereto for movement along the edges of the base permits the taking of exact measurement of the width of the foot regardless of its length.

I claim as my invention:

1. A foot measuring device including a base having means for measuring the length of a foot, said base having a portion with divergent edges and flexible width measuring means secured to and adapted for movement along said divergent edges.

2. A foot measuring device including a base having means for measuring the length of a foot, said base having a portion with divergent edges, each of said edges having a slot adjacent and in parallelism therewith, and flexible width measuring means secured to said base through said slots and adapted for movement along said divergent edges.

3. A foot measuring device including a base forming a support for a fixed heel-piece and a movable toe-piece, said base having length markings thereon cooperating with said toe-piece and a portion with divergent edges and width measuring tapes secured to and adapted for movement along said divergent edges.

4. A foot measuring device including a base, a heel-piece fixed thereto, a toe-piece movable thereon, said base being formed with a guideway through which said movable toe-piece is connected thereto, there being length markings along said guideway cooperating with said toe-piece, said base having a portion with divergent edges, and width measuring means secured to and adapted for movement along said divergent edges, said width measuring means being adapted to cooperate to measure the width of a foot.

5. A foot measuring device including a base, a heel-piece fixed thereto, a toe-piece movable thereon, said base being formed with a guideway through which said toe-piece is movably connected thereto, there being length markings on the base along said guideway cooperating with said toe-piece, said base having a portion with divergent edges, and coacting width measuring tapes secured to and adapted for movement along said divergent edges.

6. A foot measuring device including a base, a heel-piece fixed thereto, a movable toe-piece supported thereby, said base having a guideway through which said movable toe-piece is connected to said base, there being length markings along said guideway cooperating with said toe-piece, said base having a portion with divergent edges and also having slots adjacent and parallel to said divergent edges, and width measuring tapes secured to said base through said slots and adapted for movement along said divergent edges.

In testimony whereof I have signed this specification.

ALLEN B. HUNT.